United States Patent
Zehrung, Jr. et al.

[11] Patent Number: 5,690,178
[45] Date of Patent: Nov. 25, 1997

[54] SOD CUTTER

[75] Inventors: Claude D. Zehrung, Jr., Denver; William H. Oliver, Highlands Ranch, both of Colo.

[73] Assignee: Bluebird International, Inc., Englewood, Colo.

[21] Appl. No.: 601,181

[22] Filed: Feb. 14, 1996

[51] Int. Cl.$^6$ ............................................. A01B 45/04
[52] U.S. Cl. ............................ 172/19; 172/42; 172/481
[58] Field of Search ............................ 172/19, 42, 481; 56/17.1, DIG. 18

[56] References Cited

U.S. PATENT DOCUMENTS

| | | | |
|---|---|---|---|
| 2,682,824 | 7/1954 | Bowser et al. | 172/19 |
| 2,702,502 | 2/1955 | Rogneby | 172/19 |
| 2,905,253 | 9/1959 | Ditter | 172/19 |
| 3,201,944 | 8/1965 | Christensen | 172/19 X |
| 3,357,499 | 12/1967 | Finneyfrock | 172/19 |
| 3,672,452 | 6/1972 | Miner | 172/19 |
| 3,695,713 | 10/1972 | Rothi et al. | 172/19 X |
| 3,738,431 | 6/1973 | Gennow . | |
| 4,162,726 | 7/1979 | Hudson et al. . | |
| 4,553,606 | 11/1985 | Arnold | 172/19 |
| 4,616,713 | 10/1986 | Shattuck | 172/19 |
| 4,892,153 | 1/1990 | Cooling et al. . | |
| 4,982,800 | 1/1991 | Shields | 172/19 |
| 5,009,270 | 4/1991 | Vangsgard | 172/19 X |

FOREIGN PATENT DOCUMENTS

| | | | |
|---|---|---|---|
| 1191618 | 4/1965 | Germany | 172/19 |
| 926993 | 5/1963 | United Kingdom | 172/19 |

OTHER PUBLICATIONS

Ryan Turf Care catalog (Cushman Ransomes Ryan, Minneapolis, MN, 1994) pp. 12–13.

*Primary Examiner*—Terry Lee Melius
*Assistant Examiner*—Christopher J. Novosad
*Attorney, Agent, or Firm*—Dorr, Carson, Sloan & Birney, P.C.

[57] ABSTRACT

A compact, follow-behind sod cutter employs a frame with two front wheels and two rear wheels. A motor mounted to the frame drives all four wheels for improved traction and stability. The motor also drives an oscillating blade adjacent to said rear wheels. A handle extends rearward from the frame for guiding the sod cutter. A linkage having a proximal portion adjacent to the handle allows the blade to be selectively moved between a raised position in which the blade is above the sod and a lowered position in which the blade cuts the sod.

16 Claims, 6 Drawing Sheets

SOD CUTTER

BACKGROUND OF THE INVENTION

1. Field of the Invention

The present invention relates generally to the field of sod cutters. More specifically, the present invention discloses a compact, follow-behind sod cutter that is equipped with four-wheel drive for increased stability and traction.

2. Statement of the Problem

Sod cutters have been available for many years, both for harvesting sod at commercial sod farms and for removing sections of sod for replacement or landscape redesign applications. Sod farms typically use large sod cutters that are self-propelled or pulled by a tractor. These large commercial sod cutters often include elaborate systems for stacking or palletizing uniform pieces of sod as they are harvested. Other commercial sod cutters automatically roll each piece of sod. The operator usually rides on a seat carried by the sod cutter or the tractor.

In contrast, smaller sod cutters are more commonly used to remove sod. For example, it may necessary to remove damaged sod for replacement, or sod may be removed for renovation and landscape redesign applications, such as installing gardens, driveways, tennis courts, walkways, swimming pools, etc. This is occasionally referred to as the "tear out" market. Smaller areas of sod are usually involved, and it is often necessary to transport the sod cutter to remote areas. The need to remove sod is usually encountered by homeowners only on a one-time basis, or by landscape professionals only on an occasional basis. As a result, this type of sod cutter is often rented on a short-term basis by equipment rental stores to customers having little or no experience in operating this equipment. Therefore, tear-out sod cutters must be compact, portable, and simple to use. The operator typically walks behind the sod cutter. This type of unit is sometimes referred to as a "follow-behind" sod cutter, because the user follows behind the sod cutter while it is in operation.

The prior art in this field shows a wide variety of sod cutters for harvesting sod and tear-out sod cutters, including the following:

| Inventor | Patent No. | Issue Date |
| --- | --- | --- |
| Vangsgard | 5,009,270 | Apr. 23, 1991 |
| Shields | 4,982,800 | Jan. 8, 1991 |
| Cooling et al. | 4,892,153 | Jan. 9, 1990 |
| Hudson et al. | 4,162,726 | July 31, 1979 |
| Gennow | 3,738,431 | June 12, 1973 |
| Miner | 3,672,452 | June 27, 1972 |
| Finneyfrock | 3,357,499 | Dec. 12, 1967 |

"Ryan Turf Care" catalog (Cushman Ransomes Ryan, Minneapolis, Minn. 1994).

Vangsgard discloses a sod cutter that uses a single handle 90 to both adjust the elevation of the blade and lock the blade at the desired depth.

Shields discloses an example of a manual sod cutter having a diagonal handle. Stabilizing members (e.g., wheels) ensure a uniform cutting depth.

Cooling et al. disclose a sod harvester in which two cutter heads form sod into two side-by-side strips. The strips are then wound into rolls on a roller at the rear of the harvester.

Hudson et al. disclose a self-propelled sod-harvesting machine. A cutter head separates a strip of sod from the ground. An elevator raises the strip to a blade assembly where it is cut into individual sod pads and stacked.

Gennow discloses a sod cutter with a linkage that maintains a constant angular relation of the blade to the frame as the blade is raised and lowered. In particular, the blade moves downward and rearward relative to the frame during movement of the blade into the ground. Similarly, the blade moves upward and forward relative to the frame during movement of the blade out of the ground.

Miner discloses an example of an apparatus for harvesting sod. A reciprocating cutting head at the front of the apparatus cuts a continuous strip of sod. A convey carries the strip to the rear of the apparatus where a flail removes excess soil from the underside of the strip. The strip is then cut into sod pads, folded, and placed on a pallet-supporting area at the rear of the apparatus.

Finneyfrock discloses a tuff cutter that is pulled by a tractor. An oscillating transverse cutter blade 90 extends between two cutter rollers 14.

The "Ryan Tuff Care" catalog shows two follow-behind sod cutters that are widely used in the industry. The "Jr. Sod Cutter" shown on page 12 is a smaller, two-wheeled sod cutter. This device must be continually balanced by the user to maintain a uniform cutting depth. In addition, the user must operate two levers located forward of the handles to engage the cutting blade and control its depth. The "Heavy-Duty Sod Cutter" shown on page 13 is a larger unit that has two large front wheels driven by the motor and two rear wheels that prevent the unit from tipping rearward.

3. Solution to the Problem

None of these prior art references show a follow-behind sod cutter that has the configuration of the present invention. In particular, the present sod cutter is equipped with four-wheel drive for increased traction and stability, and with controls that are all conveniently placed adjacent to the handle for ease of use.

SUMMARY OF THE INVENTION

This invention provides a compact, follow-behind sod cutter with four-wheel drive. The sod cutter employs a frame with two front wheels and two rear wheels. A motor mounted to the frame drives all four wheels for improved traction and stability. The motor also drives an oscillating blade adjacent to said rear wheels. A handle extends rearward from the frame for guiding the sod cutter. A linkage having a proximal portion adjacent to the handle allows the blade to be selectively moved between a raised position in which the blade is above the sod and a lowered position in which the blade cuts the sod.

A primary object of the present invention is to provide a follow-behind sod cutter that offers increased stability and traction and, in particular, that does not have to be balanced by the user.

Another object of the present invention is to provide a sod cutter having all of its controls conveniently located adjacent to the handle for ease of use.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

Figure 2:
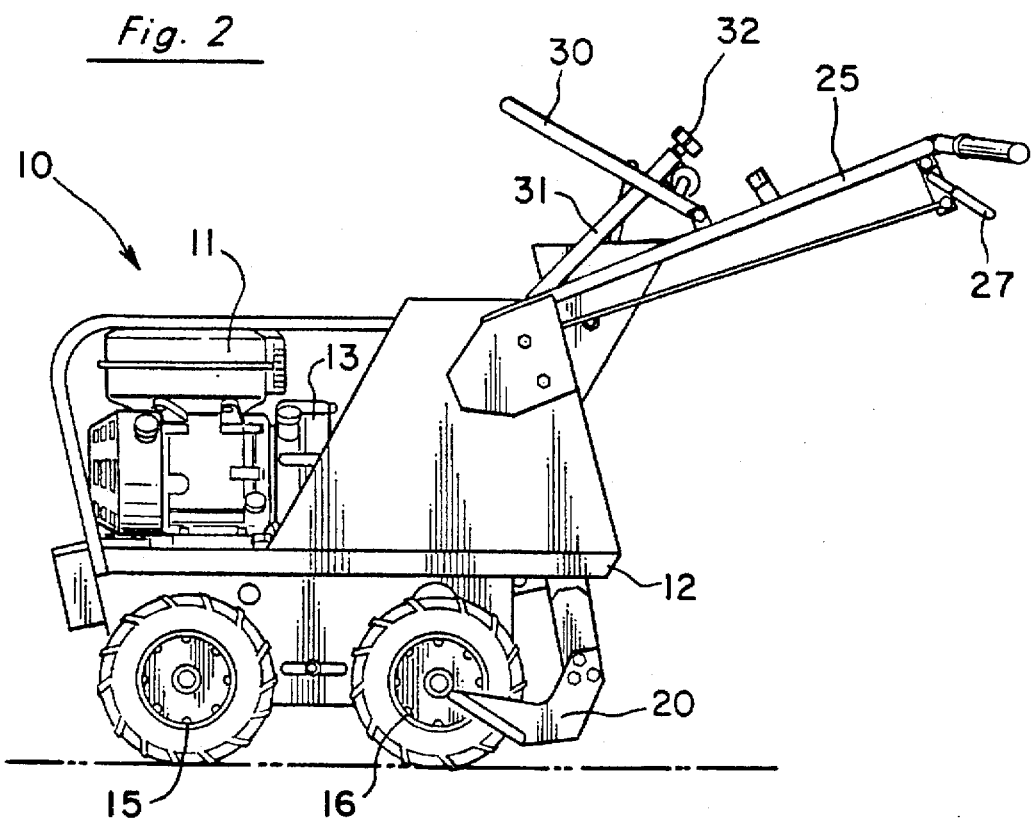
FIG. 2 is a side elevational view of the sod cutter with the blade assembly raised.

2A is a side elevational view of the sod cutter corresponding to FIG. 2 with the blade assembly lowered.

Figure 3:
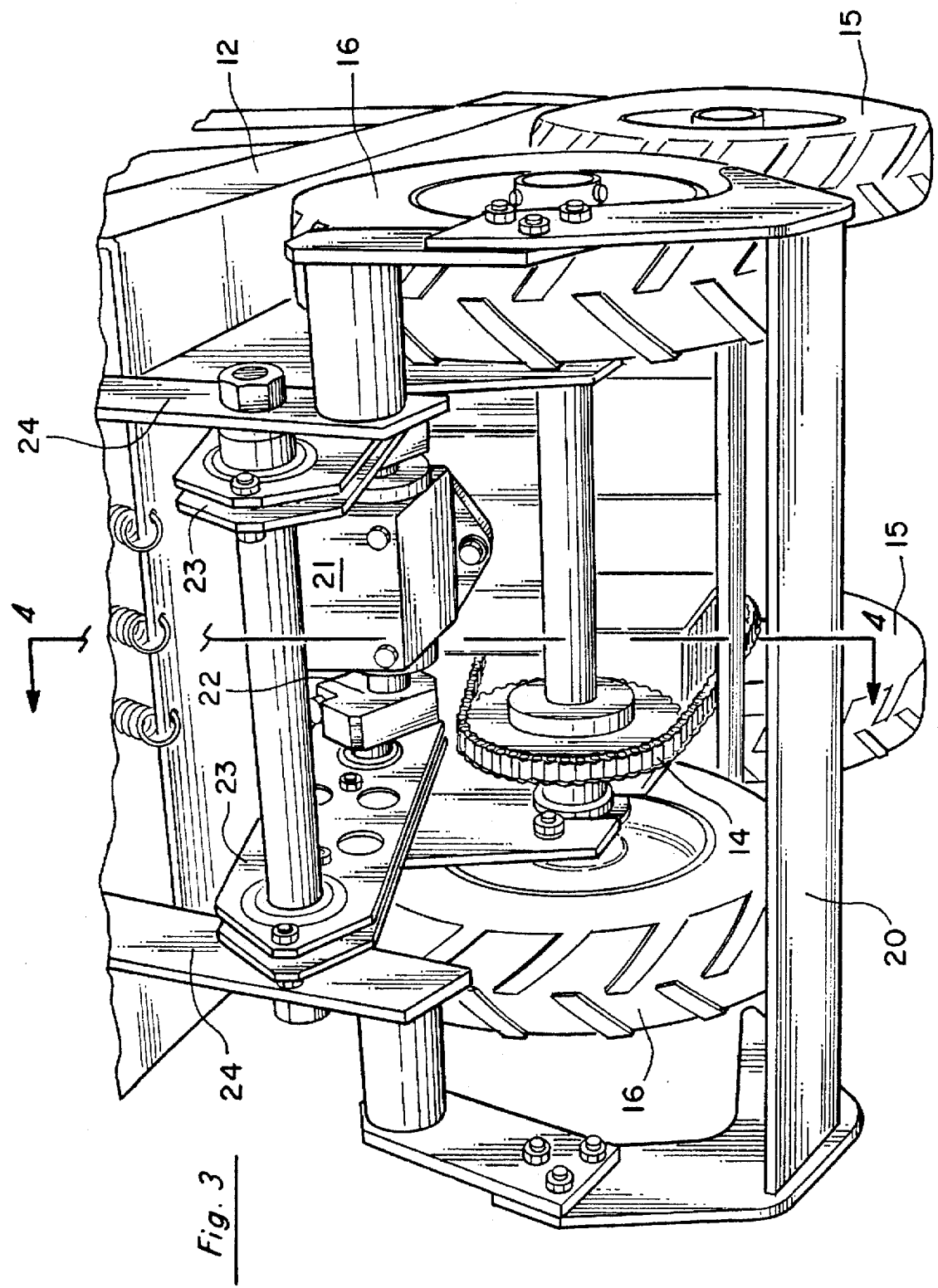

FIG. 3 is a fragmentary rear perspective view of the lower portion of the sod cutter showing the blade assembly and linkage.

Figure 4:
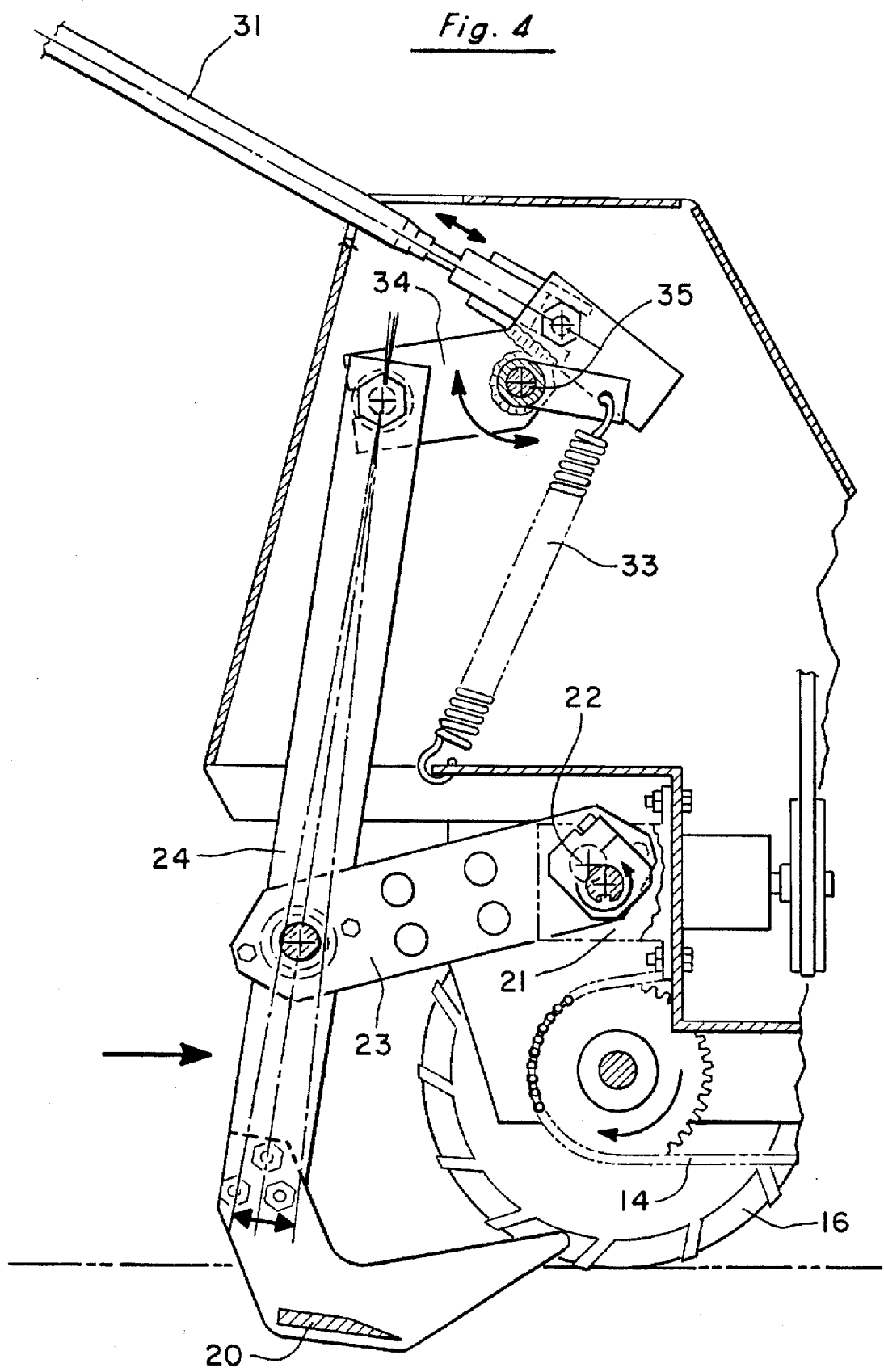

FIG. 4 is a side cross-sectional view of the blade assembly and linkage showing the blade lowered.

Figure 5:
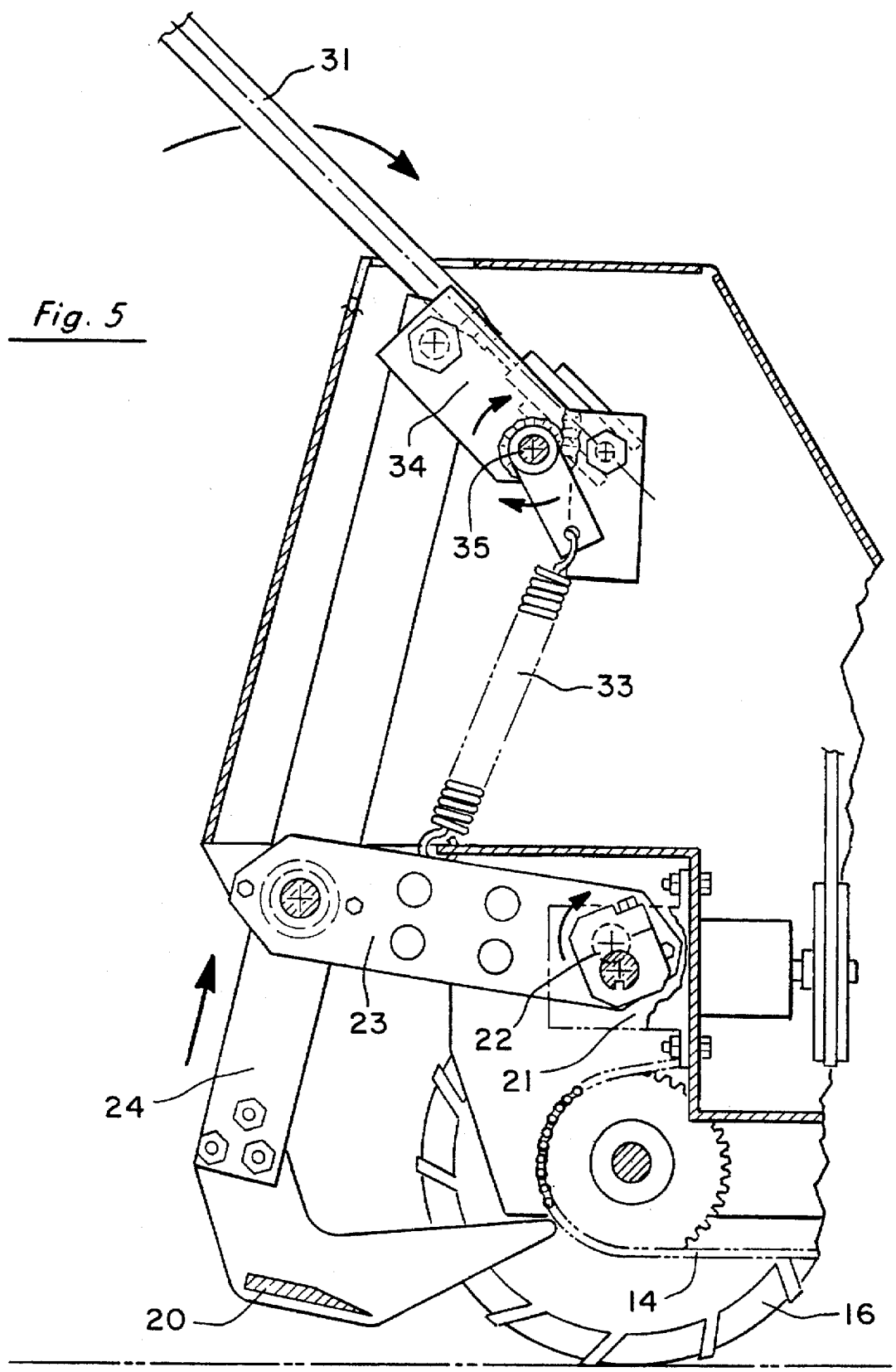

FIG. 5 is a side cross-sectional view of the blade assembly and linkage showing the blade raised.

Figure 6:
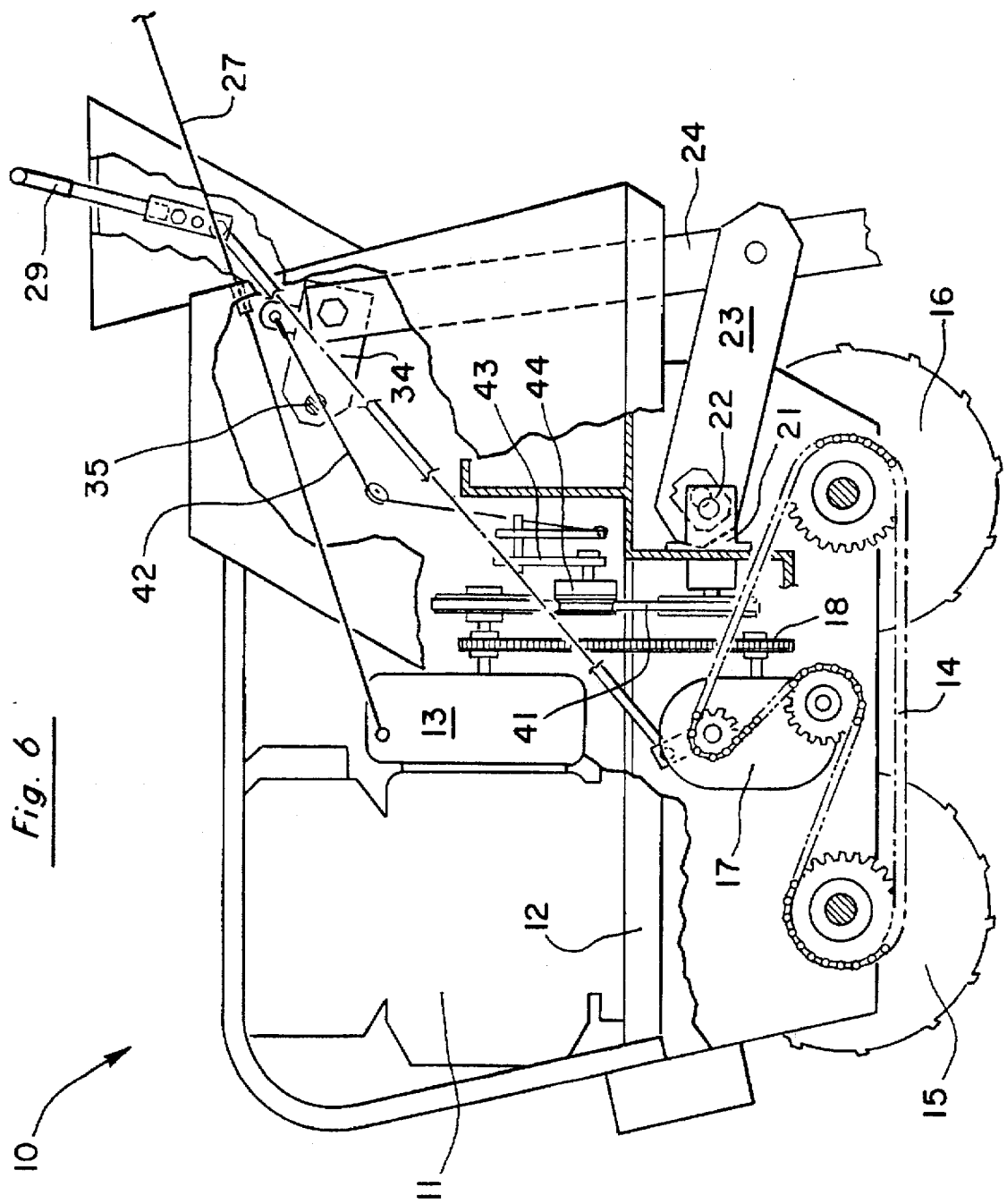

FIG. 6 is a side cross-sectional view showing the drive mechanisms for the wheels and blade assembly.

DETAILED DESCRIPTION OF THE INVENTION

Figure 1:
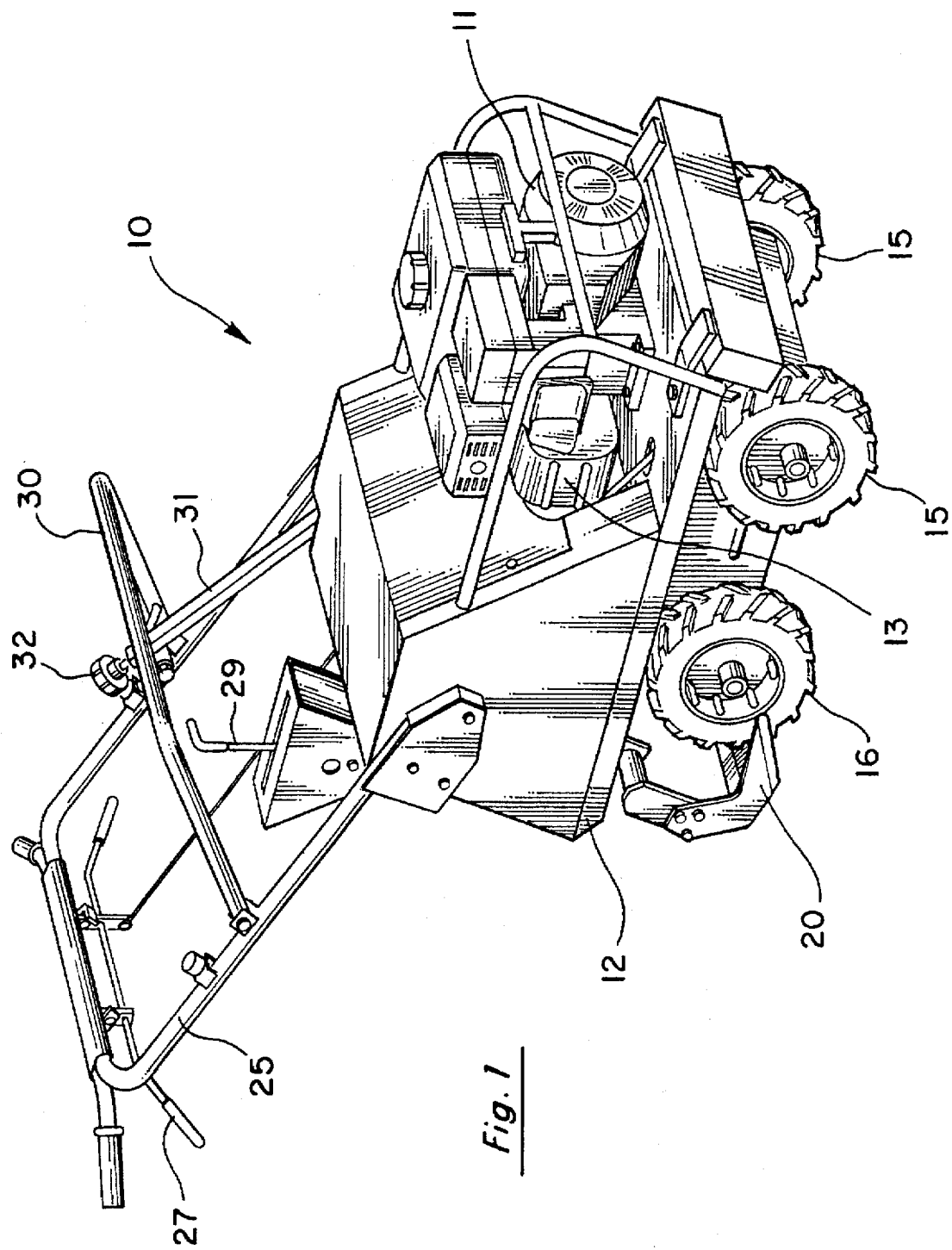
FIG. 1 is a front perspective view of the sod cutter.

Turning to FIG. 1, a front perspective view is provided of the sod cutter 10. Two front wheels 15 and two rear wheels 16 support the frame 12 of the sod cutter 10. The wheels 15, 16 define a substantially horizontal plane for movement of the frame 12 above the sod. Additional wheels or caterpillar treads could be employed to further increase stability and traction.

A handle 25 extends rearward from the frame 12 to allow the operator to steer the sod cutter 10. All of the controls necessary for operation of the sod cutter 10 are conveniently located adjacent to the handle 25 and within reach of the operator, as will be discussed in detail below. In the preferred embodiment, the handle 25 is a generally U-shaped piece of metal tubing that extends diagonally rearward and upward from the rear portion of the frame 12. Two antivibration mounts secure the forward ends of the handle 25 to the frame 12, but also permit a limited range of angular rotation to accommodate different operators.

A motor 11 provides power for the sod cutter, e.g., a 5.5 horsepower Honda gasoline engine. The motor 11 is mounted to the frame 12 between the front and rear wheels 15, 16 to maximize stability. The location of the motor 11 relative to the frame 12 can be selected to achieve a desired center of gravity for the sod cutter 10. As shown in the side cross-sectional view of the drive train for the wheels and blade assembly depicted in FIG. 6, the motor 11 drives a centrifugal clutch 13. The output shaft of the clutch 13 drives a chain 18, which drives a transmission 17. The transmission 17 drives a second chain 14 to turn the wheels 15, 16. In the preferred embodiment, the chain 14 simultaneously drives all four wheels for increased traction. However, other drive configurations could be employed. The transmission 17 typically includes several forward and reverse speeds. For example, the preferred embodiment includes two forward gears for cutting sod, two higher-speed gears for transporting the sod cutter, and a reverse gear. The user manually selects a desired gear by moving the gear selector lever 29 located adjacent to the handle 25.

Operation of the clutch 13 is controlled by shut-off handles 27 adjacent to the handle 25, as shown in FIGS. 1 and 6. When the operator manually grips the shut-off handles 27, the clutch 13 is engaged to drive the wheels 15, 16 and blade 20. However as a safety feature, the clutch 13 will automatically disengage if the operator releases the shut-off handles 27. This prevents the sod cutter 10 from continuing to move if the operator loses control.

Figure 2A:
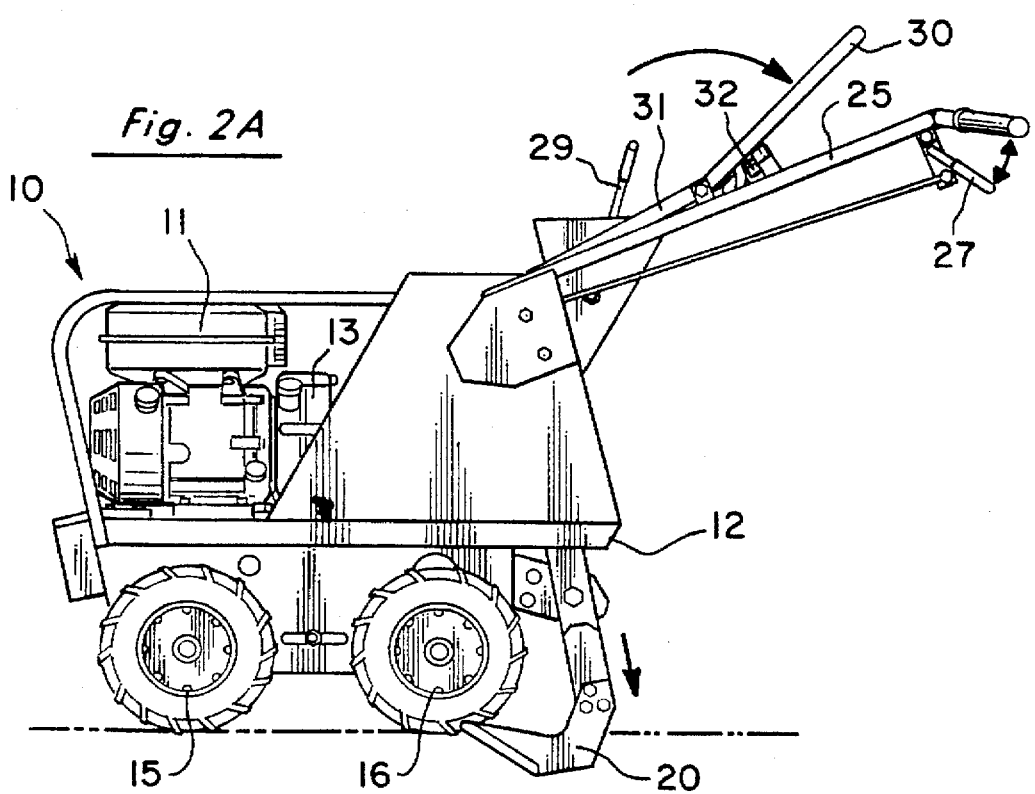

An oscillating blade 20 located adjacent to the rear wheels 16 is used to cut the sod. FIGS. 2 and 5 are side elevational and side cross-sectional views, respectively, showing the sod cutter 10 with the blade assembly raised so that the blade 20 is above the sod. FIGS. 2A and 4 are corresponding side elevational and side cross-sectional views, respectively, showing the blade linkage lowered so that the blade 20 cuts the sod. FIG. 3 is a fragmentary rear perspective view of the lower rear portion of the sod cutter 10 showing further detail of the blade assembly and linkage. As shown in FIG. 6, the clutch 13 also drives a belt and pulley arrangement 41 that delivers power to a right angle T-drive 21. The output shaft of the T-drive 21 rotates two eccentric linkages 22 that cause the short horizontal members 23 to translate back and forth as the eccentric linkages 22 rotate. This oscillatory motion by the short horizontal members 23 causes the long vertical members 24 to pivot through a short range of angular motion as illustrated in FIG. 4. In turn, the motion of the long vertical members 24 results in oscillatory forward and rearward motion of the blade 20 extending between the lower ends of the two vertical members 24.

The blade linkage also allows the operator to selectively adjust the elevation of the blade 20 between a raised position in which the blade 20 is above the sod (FIGS. 2 and 5) and a lowered position in which the blade 20 cuts the sod (FIGS. 2A and 4). The details of the blade linkage are most clearly shown in FIGS. 4 and 5. The operator controls the position of the blade 20 by moving the blade control lever 30 between the positions shown in FIGS. 2 and 2A. Here again, the blade control lever 30 is located adjacent to the handle 25 within easy reach for the operator. The blade control lever 30 is connected to a linkage rod 31 leading to the remainder of the blade linkage illustrated in FIGS. 4 and 5. When the blade control lever 30 is moved forward as shown in FIGS. 1 and 5, the short upper member 34 is rotated upward about the pivot point 35 to raise the long vertical members 24 and the blade 20. When the blade control level 30 is pulled back by the operator as shown in FIGS. 2A and 4, the short upper member 34 rotates downward about the pivot point 35 to lower the long vertical members 24 and the blade 20. The spring 33 exerts a biasing force that tends to rotate the short upper member 34 upward to keep the blade 20 in its raised position. This helps to prevent the blade 20 from being accidentally lowered.

The depth of the blade 20 at its lowered position can be adjusted by turning a depth control knob 32 adjacent to the handle 25. The depth control knob 32 effectively lengthens or shortens the linkage rod 31 by means of a screw mechanism within the linkage rod 31, and thereby adjusts the range of motion of the blade linkage.

FIG. 6 illustrates the mechanism used to automatically oscillate the blade 20 when the blade linkage is in its lowered position, and to disengage the blade 20 when the blade linkage is in its raised position. A control cable 42 extends from the short upper member 34 of the blade linkage to an idler mechanism 43. When the idler mechanism 43 is disengaged, the pulley belt 41 between the clutch 13 and right angle T-drive 21 has sufficient slack so that the output shaft of the clutch 13 can freely rotate without driving the right angle T-drive 21. When the blade linkage is lowered by the operator, the control cable 42 causes the idler mechanism 43 to push an idler wheel 44 against the pulley belt 41, which takes up the slack in the pulley belt 41 so that the clutch 13 drives the belt 41 and the right angle T-drive 21 to cause the blade 20 to oscillate, as previously described. When the blade linkage is raised by the operator, the idler mechanism 42 disengages the idler wheel 44 from the pulley belt 41 so that the blade 20 no longer oscillates.

The above disclosure sets forth a number of embodiments of the present invention. Other arrangements or embodiments, not precisely set forth, could be practiced under the teachings of the present invention and as set forth in the following claims.

We claim:

1. A sod cutter comprising:

a frame;

two front wheels and two rear wheels attached to said frame;

a motor mounted to said frame for driving said front wheels and said rear wheels;

a blade adjacent to said rear wheels driven by said motor;

a handle extending rearward from said frame for guiding said sod cutter;

a blade linkage for selectively moving said blade between a raised position in which said blade is above the sod and a lowered position in which said blade cuts the sod;

a clutch driven by said motor; and a clutch control mounted to said handle for engaging said clutch to drive said wheels, said clutch control engaging said clutch only when manually operated and automatically disengaging said clutch when released.

2. The sod cutter of claim 1 further comprising a depth control adjacent to said handle for adjusting the depth of said lowered position of said blade.

3. The sod cutter of claim 2 wherein said depth control limits the range of motion of said blade linkage.

4. The sod cutter of claim 1 wherein said blade linkage is manually operated by a proximal portion adjacent to said handle.

5. The sod cutter of claim 1 further comprising:

a transmission driven by said motor for driving said wheels in any of a plurality of speeds; and gear selector means adjacent to said handle for selecting a desired speed for said transmission.

6. The sod cutter of claim 1 further comprising means for oscillating said blade when said blade linkage is in said lowered position and disengaging said blade when said blade linkage is in said raised position.

7. A sod cutter comprising:

a frame;

two front wheels and two rear wheels attached to said frame;

a handle extending rearward from said frame for guiding said sod cutter;

a motor mounted to said frame;

a clutch driven by said motor;

a clutch control adjacent to said handle for engaging said clutch to drive said wheels, said clutch control engaging said clutch only when manually operated and automatically disengaging said clutch when released;

a blade adjacent to said rear wheels driven by said motor; and a blade linkage having a control adjacent to said handle for selectively moving said blade between a raised position in which said blade is above the sod and a lowered position in which said blade cuts the sod.

8. The sod cutter of claim 7 further comprising a depth control adjacent to said handle for adjusting the depth of said lowered position of said blade.

9. The sod cutter of claim 8 wherein said depth control limits the range of motion of said blade linkage.

10. The sod cutter of claim 7 wherein said blade linkage is manually operated by a proximal portion adjacent to said handle.

11. The sod cutter of claim 7 further comprising:

a transmission driven by said motor for driving said wheels in any of a plurality of speeds; and gear selector means adjacent to said handle for selecting a desired speed for said transmission.

12. The sod cutter of claim 7 further comprising means for oscillating said blade when said blade linkage is in said lowered position and disengaging said blade when said blade linkage is in said raised position.

13. A sod cutter comprising:

a frame;

two front wheels and two rear wheels attached to said frame;

a motor mounted to said frame for driving said front wheels and said rear wheels;

a blade adjacent to said rear wheels driven by said motor;

a handle extending rearward from said frame for guiding said sod cutter;

a blade linkage for selectively moving said blade between a raised position in which said blade is above the sod and a lowered position in which said blade cuts the sod;

means for automatically oscillating said blade when said blade linkage is in said lowered position and disengaging said blade when said blade linkage is in said raised position:, a clutch driven by said motor; and a clutch control mounted to said handle for engaging said clutch to drive said wheels, said clutch control engaging said clutch only when manually operated and automatically disengaging said clutch when released.

14. The sod cutter of claim 13 further comprising a depth control adjacent to said handle for adjusting the depth of said lowered position of said blade.

15. The sod cutter of claim 13 further comprising:

a transmission driven by said motor for driving said wheels in any of a plurality of speeds; and gear selector means adjacent to said handle for selecting a desired speed for said transmission.

16. The sod cutter of claim 13 wherein said blade linkage is manually operated by a proximal portion adjacent to said handle.

* * * * *